United States Patent [19]

Townsend

[11] Patent Number: 5,122,091
[45] Date of Patent: Jun. 16, 1992

[54] SAFETY MECHANISM FOR MEAT SKINNING MACHINES

[75] Inventor: Ray T. Townsend, Des Moines, Iowa

[73] Assignee: Townsend Engineering Company, Des Moines, Iowa

[21] Appl. No.: 585,198

[22] Filed: Sep. 20, 1990

[51] Int. Cl.⁵ ............................................. A22B 5/16
[52] U.S. Cl. .................................. 452/127; 452/125; 452/129; 192/35
[58] Field of Search ............... 452/125, 127, 129, 149; 192/35

[56] References Cited

U.S. PATENT DOCUMENTS

| | | | |
|---|---|---|---|
| 4,025,986 | 5/1977 | Koken | 452/129 |
| 4,084,292 | 4/1978 | Harlan et al. | 452/129 |
| 4,201,281 | 5/1980 | MacDonald | 192/35 |
| 4,272,862 | 6/1981 | Griffin et al. | 452/129 |
| 4,354,297 | 10/1982 | Wilson et al. | 452/129 |
| 4,965,909 | 10/1990 | McCullough et al. | 452/149 |

*Primary Examiner*—Willis Little
*Attorney, Agent, or Firm*—Zarley, McKee, Thomte, Voorhees & Sease

[57] ABSTRACT

A skinning machines having a gripping roll, a skinning blade, a power unit for rotating the gripping roll, and a safety circuit responsive to manual contact of the machine operator with danger zone of the skinning machine. A clutch is provided to the skinning machine is operatively connected to the gripping roll and the power source for the gripping roll. A brake is connected to the safety circuit and the gripping roll. The clutch is normally operative, and the brake is normally inoperative, whereby the brake will stop the rotation of the gripping roll when the safety circuit is activated to overcome the operative condition of the clutch. The brake includes a coiled spring that tightens on a hub connected to the gripping roll when the safety circuit is actuated. The safety circuit includes a solenoid device that releases the spring to tighten on the hub when the safety circuit is actuated.

3 Claims, 2 Drawing Sheets

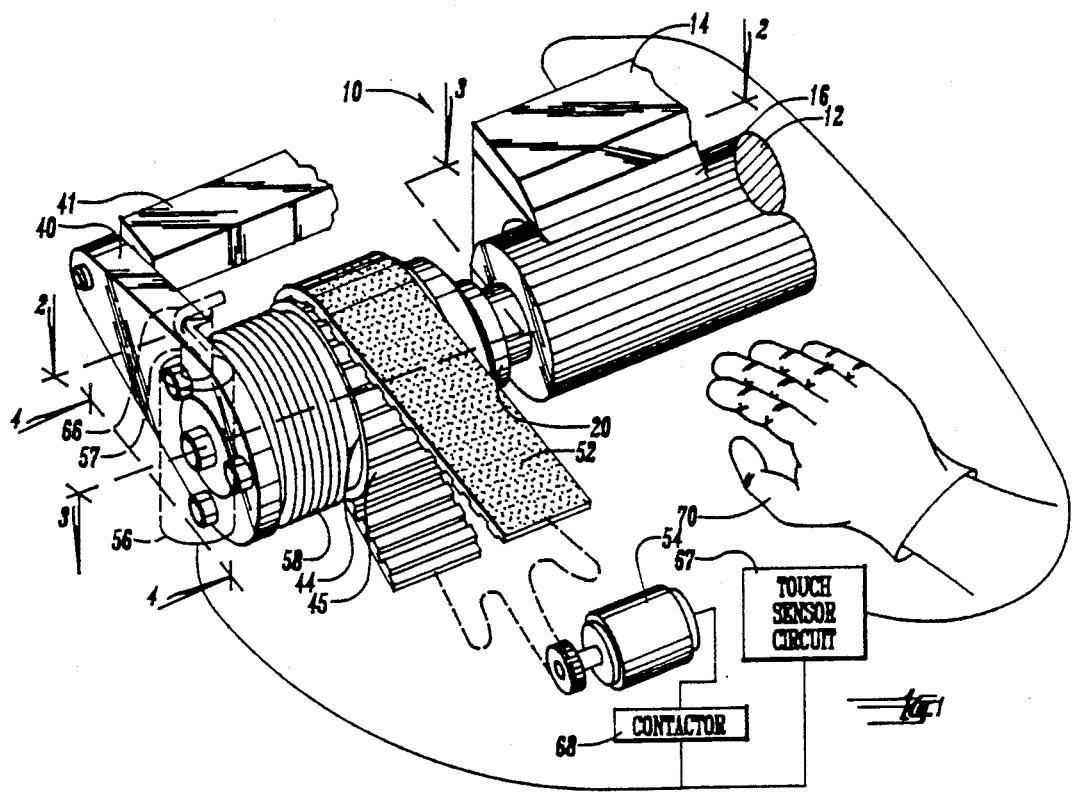
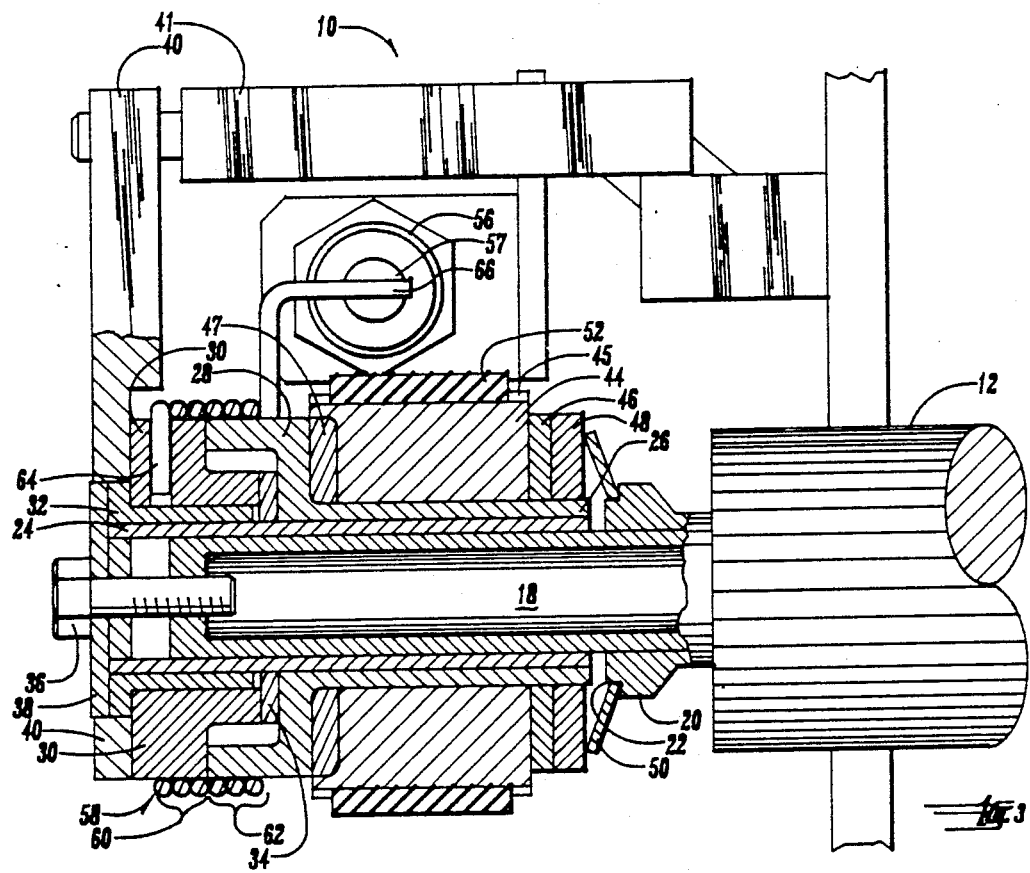

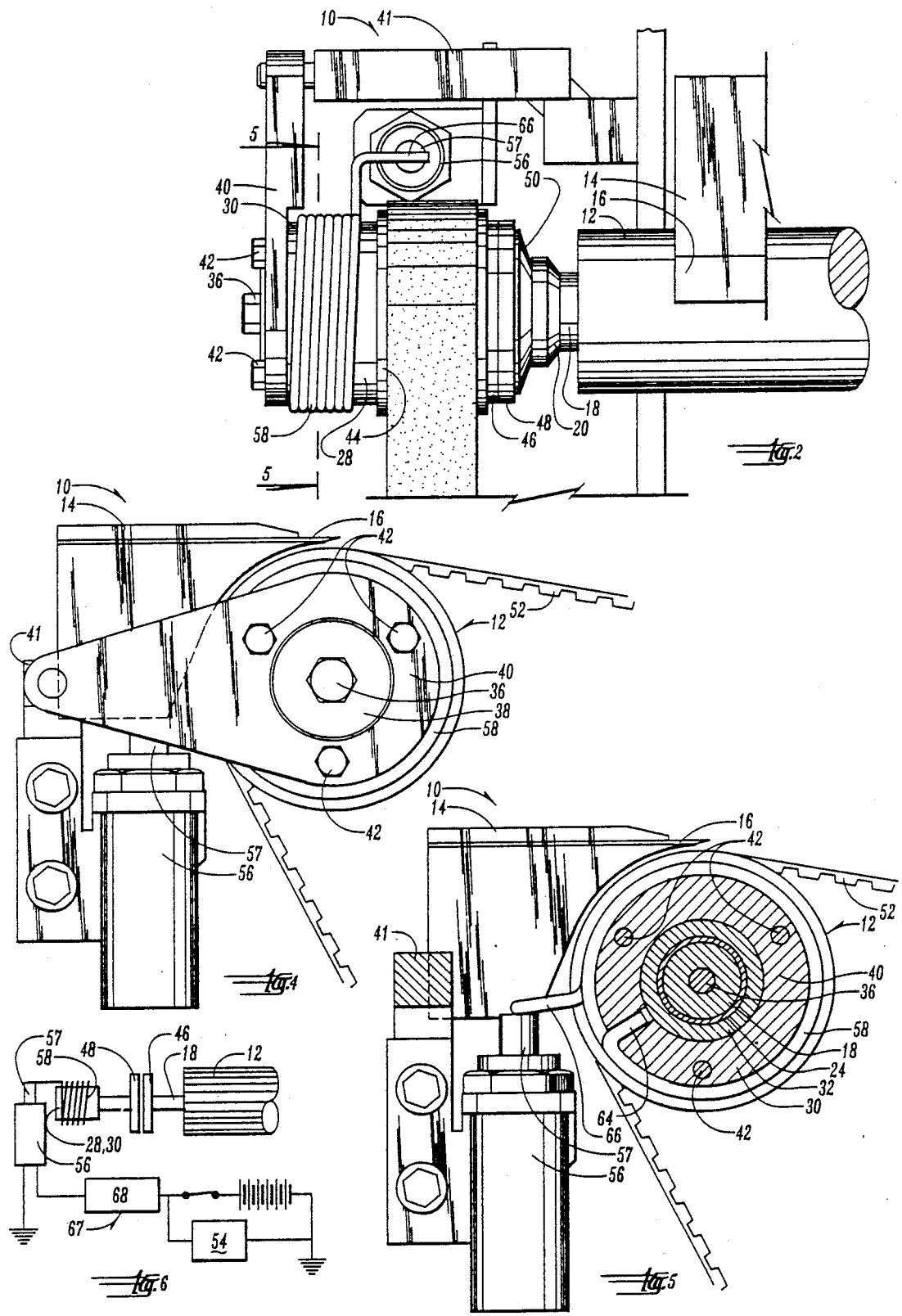

SAFETY MECHANISM FOR MEAT SKINNING MACHINES

BACKGROUND OF THE INVENTION

Meat skinning machines conventionally have a toothed gripping roll located adjacent a sharpened skinning blade for separating the skin from meat, fish and poultry products. The products to be skinned are moved manually into the gripping roll and towards the blade as the skinning operation takes place. Obviously, any contact between the operator's hands and the gripping roll and blade is likely to invite injury to the operator.

Safety circuits have been incorporated into skinning machines whereby the power to the operating components of the machine will immediately stop whenever the hands of the operator move into and contact a danger zone in the immediate area of a gripping roll and blade. Typical safety circuits are disclosed in my co-pending applications Ser. No. 426,668 filed Oct. 26, 1989 and Ser. No. 447,156 filed Dec. 7, 1989. The safety circuits of these two applications are incorporated herein by reference.

One of the difficulties in providing a safety circuit and apparatus for meat skinning machines dwells in the matter of instantaneously stopping the power mechanism when the operator inadvertently contacts components in the danger zone of the machine. The inertia of electrical motors contributes to this problem of obtaining instantaneous stoppage of the machine when a dangerous situation arises.

It is therefore a principal object of this invention to provide a safety means for meat skinning machines which will substantially instantaneously stop the gripping roll of the machine when a safety circuit is actuated without also having to deactivate the power source of the machine.

A further object of this invention is to provide a safety means for meat skinning machines which is adaptable for use with a plurality of different safety circuits.

A still further object of this invention is to provide a safety means for meat skinning machines which is reliable and easily serviced.

These and other objects will be apparent to those skilled in the art.

BRIEF SUMMARY OF THE INVENTION

This invention pertains to an improvement in skinning machines having a gripping roll, a skinning blade, a power means for rotating the gripping roll, and a safety circuit responsive to manual contact of the machine operator with danger zone of the skinning machine. A clutch means is provided on the skinning machine and is operatively connected to the gripping roll and the power source for the gripping roll. A brake means is connected to the safety circuit and the gripping roll. The clutch means is normally operative, and the brake means is normally inoperative, whereby the brake means will stop the rotation of the gripping roll when the safety circuit is activated to overcome the frictional operative condition of the clutch mechanism.

The brake means includes a coiled spring that tightens on a hub connected to the gripping roll when the safety circuit is actuated to release the spring. The safety circuit includes a solenoid device which allows tightening of the spring on the hub when the safety circuit is actuated.

BRIEF DESCRIPTION OF THE DRAWINGS

FIG. 1 is a perspective schematic view of the device of this invention;

FIG. 2 is a partial plan view shown at an enlarged scale and taken on line 2—2 of FIG. 1;

FIG. 3 is an enlarged scale sectional view taken on line 3—3 of FIG. 1;

FIG. 4 is a side elevational view taken on line 4—4 of FIG. 1;

FIG. 5 is a sectional view taken on line 5—5 of FIG. 2; and

FIG. 6 is a schematic wiring diagram showing the safety circuit of this invention.

DESCRIPTION OF THE PREFERRED EMBODIMENT

A skinning machine 10 includes a skin gripping roll 12 which normally has rows of teeth (not shown) on its peripheral surface. A shoe 14 holds blade 16 adjacent the gripping roll. These components are conventional in skinning machines as generally typified in U.S. Pat. No. 4,670,943.

The gripping roll 12 is mounted on a hollow shaft 18 (FIG. 3), and a hub 20 is mounted on shaft 18 adjacent one end of the gripping roll 12 as that shaft protrudes from one end of the gripping roll. Hub 20 has an annular groove 22 which receives the inner periphery of a concave spring disk 50 to be discussed hereafter. A sleeve 24 is rigidly secured to the outer surface of shaft 18. Similarly, a hub 26 having an annular shoulder 28 of greater diameter is also rigidly secured to sleeve 24 to rotate with the shaft 18.

A hub 30 is mounted on bushing 32 which is rotatably mounted on the outer end of sleeve 24. A bolt 36 extends through washer 38 and is threaded into the end of shaft 18 as best shown in FIG. 3.

A bracket 40 (FIGS. 1, 2 and 3) is rigidly secured to frame member 41. A plurality of bolts 42 extend through bracket 41 and rigidly secure it to hub 30. The inner connection of these components provide that frame member 41 and hub 30 do not rotate, but that bolt 36 and washer 38 so rotate with shaft 18.

A gear 44 is rotatably mounted on hub 26 and is provided with a plurality of teeth 45. Clutch disks 46 and 47 are rigidly secured to one face of gear 44. Clutch disk 48 is rotatably mounted on one end of hub 30 and is held in frictional engagement with clutch disk 46 by the concave spring disk 50 which is mounted on its inner periphery on annular groove 22 of hub 20. The outer periphery of spring disk 50 frictionally engages the outer face of clutch disk 48. Bolt 36 can be tightened or loosened to draw shaft 18 in a lateral direction as viewed in FIG. 3 to increase or decrease, respectively, the tension exerted by spring disk 50 on clutch disk 48.

A toothed drive belt 52 operatively engages gear 44 and is connected to motor 54 to provide rotational power to gear 44. The concave spring disk 50 normally forces the clutch disks 46 and 48 together to permit the gear 44 to rotatably drive shaft 18 and gripping roll 12.

A solenoid 56 is mounted on the skinning machine in any convenient manner, and has a plunger 57 (FIG. 5) which is secured to one end of brake spring 58. Spring 58 has convolutions 60 which normally loosely engage hub 30 (FIG. 3) along with convolutions 62 which normally loosely engage annular shoulder 28 of hub 26.

An end 64 of spring 58 is secured in any convenient fashion to hub 30 (see FIG. 3) such as by inserting the end 64 into a suitable aperture in the hub, and end 66 of spring 58 is secured to the plunger 57 of solenoid 56 (FIG. 5).

A safety circuit 67 of the general type disclosed in my copending applications, which are incorporated by reference herein, includes a manual contact surface 68 which functions as a switch to deprive solenoid 56 of energy, whether it be air or electricity. When solenoid 56 is so deprived of energy, the plunger 57 withdraws to release spring 58 to cause it to tighten its configuration, which causes the convolutions 62 to tighten on annular shoulder 28 of hub 30.

In operation, when the skinning machine 10 is normally functioning, the solenoid 56 is energized to normally extend plunger 57 which maintains spring 58 in its released condition. This means that convolutions 60 and 62 are not in binding engagement with hubs 30 and 28, respectively.

If the operator's hand inadvertently touches the contact area 68 within the danger zone of the machine, the power to solenoid 56 is immediately cut, whereby the conventional spring in the solenoid causes plunger 57 to withdraw to permit the convolutions 60 and 62 of the spring to tighten on their respective supporting surfaces. Specifically, convolutions 62 tighten on rotating hub 28 which, through its inner connection with shaft 18, causes the shaft to immediately cease rotation. The braking effect imposed by spring 58 on shoulder 28 of hub 26 overcomes the frictional force between the clutch disks 46 and 48 and the clutch is overridden.

The power to motor 54 has not been severed, and belt 58 will still cause gear 44 to rotate, thus causing clutch element 46 to frictionally rotate with respect to clutch disk 48. Additional circuitry can be provided, if desired, to also sever power to motor 54. However, the safety effect of this invention is based upon the braking effect of spring 58 and not the withdrawal of power to the motor 54.

From the foregoing, it is seen that this invention will achieve at least its stated objectives.

I claim:

1. An improvement in a skinning machine having a frame, a gripping roll, a skinning blade, a power means for rotating said gripping roll, and a safety circuit responsive to manual contact of the machine operator with a danger zone on said skinning machine, the improvement comprising;

a clutch means operatively connecting said gripping roll and said power means,
   a brake means connecting said safety circuit and said gripping roll,
   said clutch means being normally operative, and said brake means being normally inoperative, whereby said brake means will stop the rotation of said gripping roll when said safety circuit is activated to overcome the operative condition of said clutch means without disengaging the clutch means.

2. The apparatus of claim 1 wherein said brake means includes a coiled spring that tightens on a hub means connected to said gripping roll when said safety circuit is activated.

3. The apparatus of claim 2 wherein a solenoid means comprises a part of said safety circuit, said solenoid means being attached to said coiled spring to release said spring to allow tightening of said spring when said safety circuit is activated.

* * * * *